May 29, 1923.

A. M. FRANCHI

PISTON

Filed March 1, 1922    2 Sheets-Sheet 1

1,456,727

INVENTOR
A. M. Franchi
BY
Sigmund Herzog
ATTORNEY

May 29, 1923.

A. M. FRANCHI

PISTON

Filed March 1, 1922  2 Sheets-Sheet 2

1,456,727

INVENTOR
A. M. Franchi
BY
Sigmund Herzog
ATTORNEY

Patented May 29, 1923.

1,456,727

UNITED STATES PATENT OFFICE.

ALDO M. FRANCHI, OF NEW YORK, N. Y., ASSIGNOR TO FRANCHI RINGLESS PISTON CORPORATION, OF NEW YORK, N. Y., A CORPORATION OF NEW YORK.

PISTON.

Application filed March 1, 1922. Serial No. 540,113.

*To all whom it may concern:*

Be it known that I, ALDO M. FRANCHI, a citizen of the United States, and resident of the city of New York, in the county of New York and State of New York, have invented certain new and useful Improvements in Pistons, of which the following is a specification.

The present invention relates to improvements in pistons, and more particularly to trunk pistons, especially designed for use with internal combustion engines.

One of the objects of the invention is to provide a piston, wherein the packing is made integral with the body of the piston, the arrangement being such that a certain degree of resiliency is given to the packing, to insure a close fit between the piston and the cylinder wall, thereby preventing the gases in the cylinder from passing the piston.

Another object of the invention is to so form the piston head or working side of the piston, that the expulsion of the products of combustion from the cylinder is greatly aided thereby, the gases being deflected backwards in the direction of the longitudinal axis of the piston toward the exhaust port in the cylinder.

A further object of the invention is to provide a simple, inexpensive and durable piston rod connection, wherein the wearing of the elements is compensated, lost motion of the piston being thus precluded.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
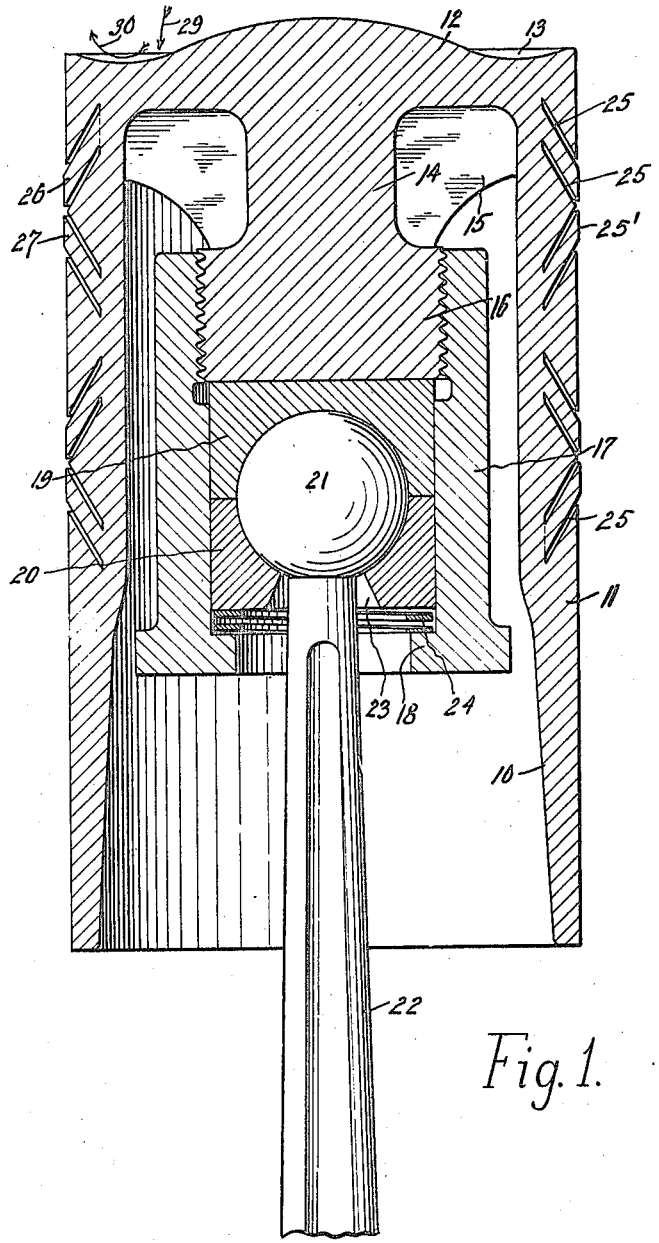
Figure 2:
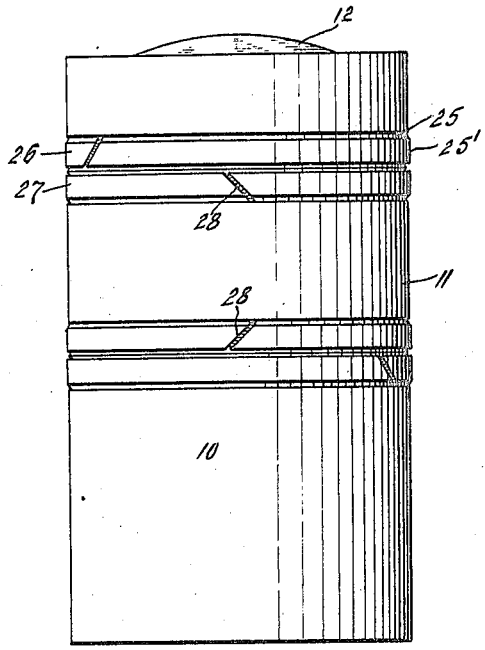
Figure 3:
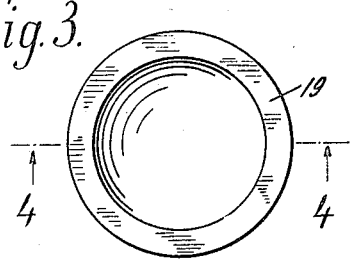
Figure 4:
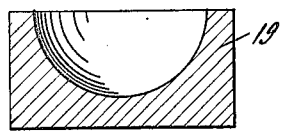
Figure 5:
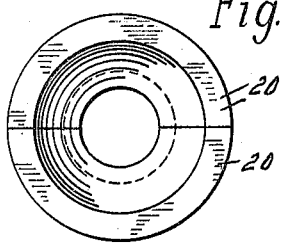
Figure 6:
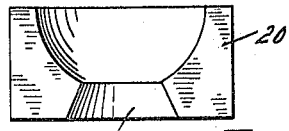

Figure 1 is a central vertical section of a piston constructed in accordance with the present invention; Fig. 2 is an elevation thereof; Fig. 3 is a bottom plan view of one element of the piston rod connecting means; Fig. 4 is a section taken on line 4—4 of Fig. 3; Fig. 5 is a top plan view of two piston rod connecting elements co-operating with the one shown in Figs. 3 and 4; and Fig. 6 is a front elevation of one of the elements shown in Fig. 5.

In the drawings, the numeral 10 indicates a trunk piston, including a cylindrical shell 11, which is open at one of its ends and closed at its opposite end by a head 12. The head is provided in its exposed face with an annular groove 13, disposed close to the periphery of a sail head in concentric relation to the longitudinal axis of the piston. The groove 13 is rather shallow and curved in transverse cross-section, its outer or peripheral portion sloping gradually toward its center, as clearly shown in Fig. 1 of the drawings.

From the cylinder head extends centrally downwards into the shell a boss 14, strengthened by ribs 15 and provided with a vertically extending screw-threaded cylindrical enlargement 16. With the threads of this enlargement mesh the interior threads of a sleeve 17, that is provided upon its lower end with an inwardly extending annular shoulder 18. In this sleeve is held, in a manner presently to be described, a bearing cup 19, with which co-operate two half cups 20. These cups constitute a spherical socket, into which is fitted the spherical head 21 of a piston rod 22, the said rod extending through recesses 23 in the cup members 20. A spring 24 rests on the annular shoulder 18 of the sleeve 17 and bears against the underfaces of the cup members 20, holding the same in close contact with the cup 19 and forcing the latter against the enlargement 16 of the boss 14.

In the outer surface of the shell 11 is formed a plurality of pairs of annular grooves 25, the grooves of each pair extending in parallel relation and each groove forming part of a conical surface, the axis of which coincides with the longitudinal axis of the piston. The grooves of each pair extend a substantial distance into the shell, and are placed so close to one another that the material of the shell between the same is somewhat resilient, it forming a ring that is attached, as it were, at its inner face to the shell, its outer face, denoted by the numeral 25′, projecting a slight distance beyond the shell. The several pairs of grooves are so formed that some of the rings, denoted by the numerals 26, project downwards, while some of the rings, denoted by the numerals 27, project upwards. Each of these rings is provided with one or more slots 28, to increase the resiliency thereof.

From the foregoing it appears that the rings are made integral with the piston body. The piston body may be made of any suitable material, preferably, in the form of a casting, in which are afterwards formed the grooves 25. The piston shell is then turned down to the proper diameter, care being taken that the rings project beyond the same, as above stated.

In assembling the piston and piston rod, the spring 24, cups 19 and 20, and the head of the piston rod are first inserted into the sleeve 17, the latter being then screwed in place upon the enlargement 16 of the boss 14. The cups are made of a suitable bearing metal. If the head 21 of the piston rod or the cups 19 and 20 wear, the spring causes the cups 19 and 20 to be held in abutment and the cup 19 to bear against the enlargement 16. Lost motion of the elements is thus prevented.

The operation of the piston is as follows: The rings 26 and 27 bear against the cylinder wall. On the downward strokes of the piston the rings 26 and on the upward stroke thereof the rings 27 are deflected, due to the friction between the same and the cylinder wall. Their diameters are thus somewhat increased, they pressing tightly against the cylinder wall and thus preventing the gases passing the piston.

The products of combustion act on the cylinder head in the direction of the arrow indicated by the numeral 29, (Fig. 1). These gases are then deflected by the groove 13 in the direction of the arrow indicated by the numeral 30, (Fig. 1), that is to say backwards in the direction of the longitudinal axis of the piston toward the exhaust port in the cylinder.

What I claim is:—

A piston including a shell having a plurality of pairs of grooves cut into the outer face thereof, the grooves of each pair extending in parallel relation a substantial distance into said shell, thereby forming a resilient ring, the rings on said shell projecting beyond the outer face thereof, each ring being provided with one or more slots.

Signed at New York, in the county of New York and State of New York this 27th day of February, A. D. 1922.

ALDO M. FRANCHI.